US006466696B1

(12) United States Patent
Politis

(10) Patent No.: US 6,466,696 B1
(45) Date of Patent: Oct. 15, 2002

(54) DERIVING POLYGONAL BOUNDARIES FROM QUADTREE REPRESENTATION

(75) Inventor: George Politis, Macquarie Fields (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/312,844

(22) Filed: May 17, 1999

(30) Foreign Application Priority Data

May 22, 1998 (AU) .............................................. PP3665

(51) Int. Cl.[7] ................................................. G06K 9/68
(52) U.S. Cl. ............. 382/226; 375/240.03; 375/240.16; 382/226; 382/240; 709/203; 709/246
(58) Field of Search ................................ 382/166, 226, 382/232, 236, 240, 248, 281; 358/430–433; 348/391–398, 405–408, 413, 415, 419, 420, 437–438

(56) References Cited

U.S. PATENT DOCUMENTS

| | | | | |
|---|---|---|---|---|
| 5,724,494 A | | 3/1998 | Politis | ......................... 395/134 |
| 5,745,121 A | | 4/1998 | Politis | ......................... 345/433 |
| 6,005,981 A | * | 12/1999 | Ng et al. | ..................... 382/240 |
| 6,084,908 A | * | 7/2000 | Chiang et al. | ..................... 375/240 |
| 6,144,773 A | * | 11/2000 | Kolarov et al. | ............. 382/240 |
| 6,163,626 A | * | 12/2000 | Andrew | ....................... 382/240 |
| 6,182,114 B1 | * | 1/2001 | Yap et al. | .................... 709/203 |

OTHER PUBLICATIONS

Charles R. Dyer, et al., "Region Representation: Boundary Codes from Quadtrees", Communications of the ACM, Mar. 1980, vol. 23, No. 3, pp. 171–179.
Hanan Samet, "The Quadtree and Related Hierarchical Data Structures", Computing Surveys, Jun. 1984, vol. 16, No. 2, pp. 187–260.

C.R. Dyer et al., "Region Representation: Boundary Codes from Quadtrees", Communications of the ACM, Mar. 1980, vol. 23, No. 3, pp. 171–179.

H. Samet, "The Quadtree and Related Hierarchical Data Structures", ACM Computing Systems, Jun. 1984, vol. 16, No. 2, pp. 187–260.

* cited by examiner

Primary Examiner—Leo Boudreau
Assistant Examiner—Gregory Desire
(74) Attorney, Agent, or Firm—Fitzpatrick, Cella, Harper & Scinto

(57) ABSTRACT

A method of conversion of a quadtree representation of image data into a corresponding representation of edges of regions within the image is disclosed. In one configuration the method comprises recursively processing (70) each quadrant using a number of steps. A first step examines if the quadrant is of a first particular uniform type (74), and if so, the method forms a series of lists (76) defining the boundary structure of the quadrant. A second step examines if the quadrant is of a second particular uniform type (80), and if so, the method forms a series of empty lists (82). A third step is applied where a quadrant is of an intermediate type containing data values of the first particular uniform type and the second particular uniform type, and the method divides the quadrant into a series of sub-quadrants (84,88) and recursively (86) applies the first, second and third steps to each of the sub-quadrants in accordance with the quadtree representation. The method combines the results produced from the recursive application to produce an intermediate description of the border regions of the quadrant such that the intermediate description of the root node of the quadtree comprises a description of the border of regions of the first particular uniform type of the image data.

44 Claims, 9 Drawing Sheets

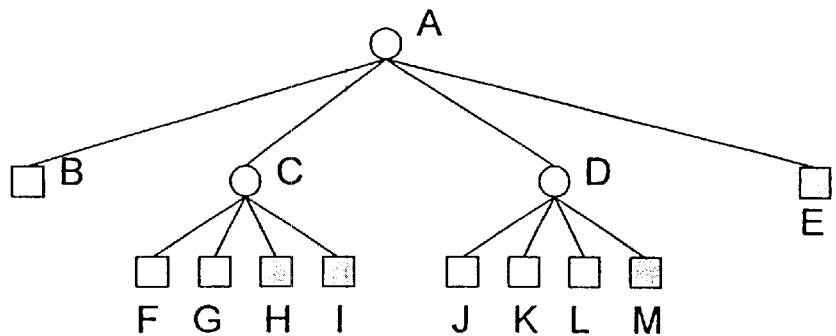
Fig. 10A
(Prior Art)
Fig. 10B
(Prior Art)
Fig. 10C
(Prior Art)
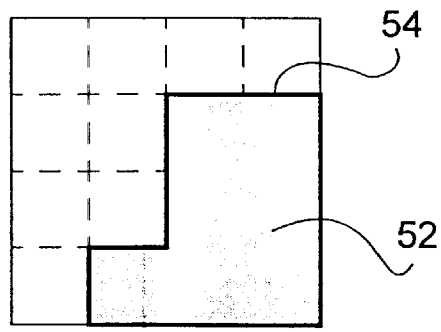
Fig. 10D

DERIVING POLYGONAL BOUNDARIES FROM QUADTREE REPRESENTATION

FIELD OF THE INVENTION

The present invention relates to the field of digital data processing and, in particular, to the utilisation of quadtree representations of data.

BACKGROUND OF THE INVENTION

The utilisation of quadtree data representations in the field of computer data storage is well known. Quadtrees have particular application in representing image data, however, they are not limited thereto and apply generally to any data, including data having multiple dimensions, where extensions to structures such as octrees is also well known. For a comprehensive survey of the field of quadtrees and related hierarchical data structures, reference is made to "The Quadtree and Related Hierarchical Data Structures" by Hanan Samet appearing in *Computer Surveys*, Vol. 16, No. 2, June 1984 at pages 187–260 (hereinafter Samet).

A quadtree representation is often utilised in image data storage for its known advantages. However, it is often necessary to determine a boundary of a structure within an image given a quadtree representation of a whole image. Various techniques for determining a boundary of a portion of an image given a quadtree representation of the image are known. For example, Samet refers to one form of region determination described in "Region Representation: Boundary Codes from Quadtrees" by C. R. Dyer, A. Rosenfield, and H. Samet, appearing in the *Communications of the ACM*, March 1980, Vol. 23, No. 3 at page 171–179 (hereinafter Dyer et al.).

Unfortunately, such techniques have a number of significant disadvantages. For example, the technique of Dyer et al. utilises the presence of backpointers within the quadtree. That is, each tree node requires a pointer to its parent node. However, this is not always easily possible. For example, in a situation where set operations (union, intersection, difference) are frequently being performed, it is advantageous to reuse cells between quadtrees. The utilisation of quadtrees for set operations is fully discussed in the aforementioned survey article. Using such operations, any cell may have more than one parent since it may be part of more than one tree and multiple backpointers would have to be provided.

The method of Dyer et al. is also unable to handle quadtrees containing a number of disjoint boundaries as well as boundaries that form islands inside holes.

SUMMARY OF THE INVENTION

It is an object of the present invention to provide for an alternative method and apparatus for the derivation of a boundary representation of regions within quadtree type represented data, images for example.

In accordance with a first aspect of the present invention, there is provided a method of conversion of a quadtree type representation of image type data into a corresponding representation of edges of regions within the image type, the method comprising the steps of:

recursively processing each quadrant of the quadtree type representation such that:
(a) where a cell is of a first particular uniform type, creating a polygon that represents the area bounded by the cell, and forming a description of the structure of the cell's borders;
(b) where a cell is of a second particular uniform type forming empty border descriptions for the cell;
(c) where a cell is divided into quadrants,
  (i) recursively applying steps (a) to (c) to each of the quadrants in accordance with the quadtree representation,
  (ii) obtaining from step (i) border description of each border of each quadrant;
  (iii) using said border descriptions to combine the polygonal representations for each quadrant of the cell into a polygonal representation for the entire cell, and
  (iv) combining said border descriptions to construct border description for the entire cell;
such that, for the root node of the tree, a boundary structure is formed of the one or more regions of the tree defined by the nodes of first particular uniform type.

In accordance with a second aspect of the present invention, there is provided a method of conversion of a tree representation of one or more data regions with each tree node representing regional data of a first particular uniform type, a second particular uniform type or a mixture of the types and wherein when a node represents a mixture of the types it includes a number of child nodes representing sub-regions of the data, the conversion being to a corresponding representation of edges of data regions, the method comprising the steps of:

recursively processing each node of the tree representation such that:
(a) where a node's regional data is of a first particular uniform type, creating a structure defining the boundary structure of the regional data, and forming a description of the structure of the borders of the area represented by the node;
(b) where a node's regional data is of a second particular uniform type, forming a null description of the structure of the borders of the area represented by the node;
(c) where a node's regional data is of an intermediate type containing data values of the first particular uniform type and the second particular uniform type;
  (i) recursively applying the steps (a) to (c) to each of the child nodes,
  (ii) obtaining from step (i) border descriptions of each border of each child node,
  (iii) using said border descriptions to combine the boundary structures of the regions represented by each child node into a boundary structure of the region represented by the node, and
  (iv) combining border descriptions of the child nodes as necessary to produce border descriptions of the structure of the borders of the area represented by the node;
such that, for the root node of the tree, a boundary structure is formed of the one or more regions of the tree defined by the nodes of first particular uniform type. Other aspects of the invention to be described include apparatus for performing the conversion, and a computer readable medium including a computer program product for performing the conversion.

The preferred embodiments of the present invention, however, will be described with reference to image data and the quadtree representation.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIGS. 10A to 10D illustrate the conversion of a quadtree representation into a corresponding region boundary representation;

DETAILED DESCRIPTION OF THE PREFERRED AND OTHER EMBODIMENTS

In the preferred embodiment, a recursive method is provided for converting a quadtree representation of a region to a corresponding polygonal representation. The method does not require backpointers and treats the quadtree as a read-only data structure. The preferred embodiment can handle quadtrees containing any number of disjoint boundaries as well as boundaries that form holes and islands inside holes.

Figure 1:
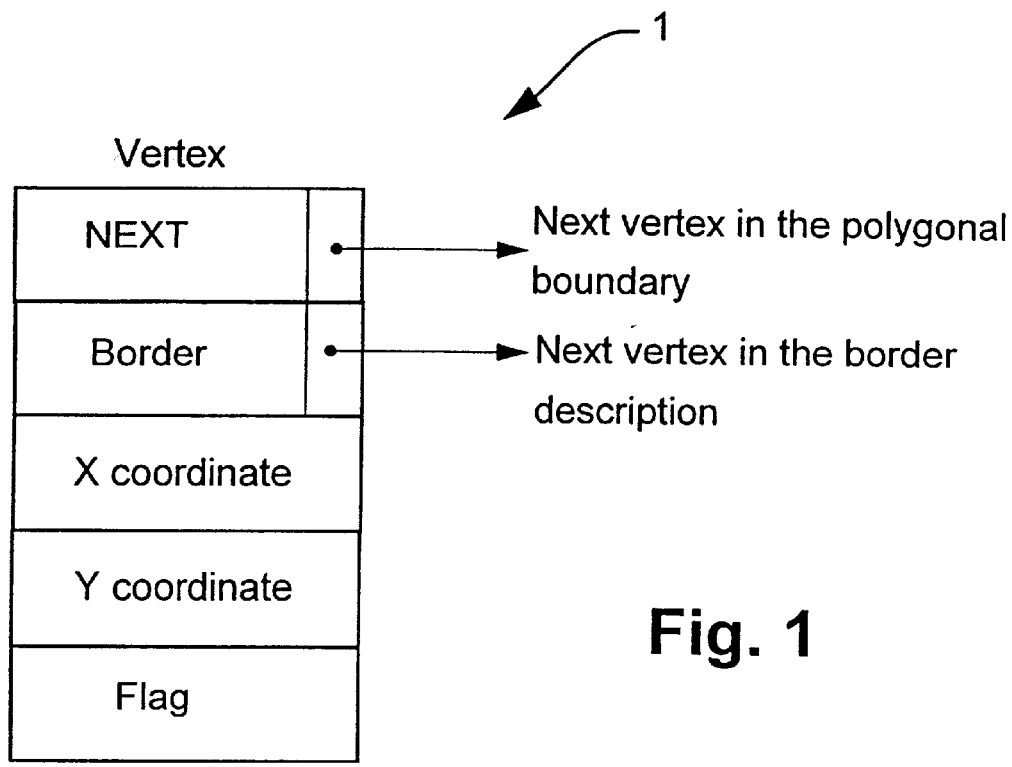
FIG. 1 illustrates the vertex data structure utilised in the preferred embodiments.

Referring to FIG. 1, the preferred embodiment utilises a particular data structure 1 for storing the vertices of a polygonal representation of a region represented by the quadtree. As they are created, polygon vertices are remembered. When the quadtree traversal is completed, the gathered-up vertices are searched for cycles that form the boundaries of a region. As seen in FIG. 1, each individual vertex includes x and y coordinate position information (Pt[0], Pt[1]) in addition to two pointers, being a next polygonal boundary vertex pointer and a next border list vertex pointer. A "Flag" field is also defined, as described below. The vertex structure can be formed along the lines of the following C code fragment:

```
struct Vertex
{
    Vertex   *Next;    /*next vertex in polygon boundary*/
    Vertex   *Border;  /*next entry in border list*/
    int      Pt[2];    /*coordinates of vertex*/
    int      Flag;     /*used when finding cycles*/
};
```

Border lists are constructed and merged as part of a key activity of the method of the preferred embodiment. A border list is a linked list of the first of each pair of vertices whose interconnecting edge lies along a particular quadtree cell border. The vertices in a border list are stored in order of increasing coordinate values irrespective of whether the corresponding edges run in an increasing or decreasing order. In order to be able to concatenate border lists, ideally a pointer to the head of the list and a pointer to the end of the list are stored. For the purpose of the preferred embodiment, the quadtree is be assumed to be represented in the normal manner (as set out in Samet) wherein the quadtree is a tree of degree 4 (in which each non-leaf node has four child nodes), the root node corresponds to the entire region being represented, each child of a node represents a quadrant (labelled in order North-West, North-East, South-West and South-East) of the region represented by the parent node, and the leaf nodes of the tree correspond to those blocks for which no further sub-division is necessary. In the preferred embodiment the leaf node is termed BLACK or WHITE, depending on whether its corresponding block is entirely inside or entirely outside of the represented region, respectively, and all non-leaf nodes are termed GREY.

Figure 2:
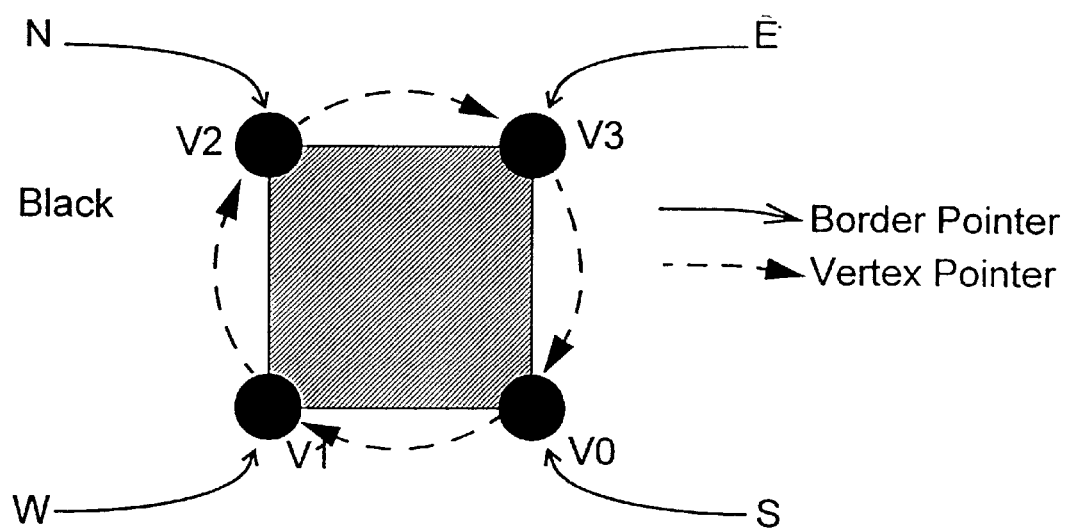
FIG. 2 illustrates the data structures constructed upon reaching a BLACK cell in the preferred embodiment.
Figure 3:
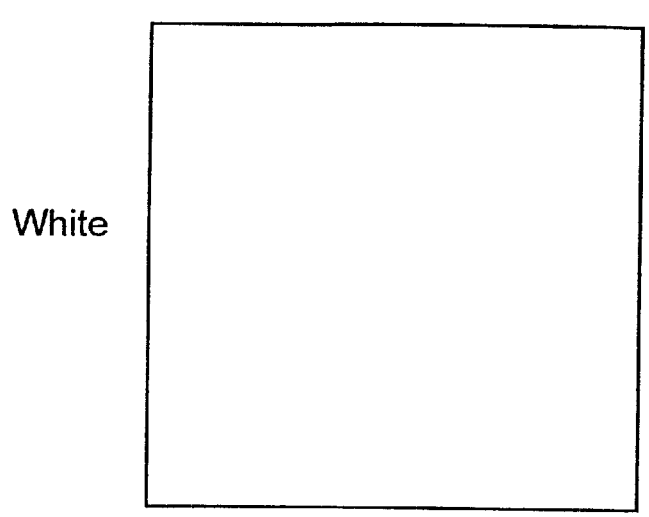
FIG. 3 illustrates the data structure constructed when reaching the WHITE cell in the preferred embodiment.

The method of the preferred embodiment has two stages. The first stage traverses the quadtree in a depth-first fashion. At each BLACK cell, a structure as in FIG. 2 is constructed. Four vertices (V0, V1, V2 and V3) are constructed and joined into a polygon using the "Next" pointers in the vertex definition of the preferred embodiment. Four border lists are constructed (E, N, W and S) containing one vertex each (V3, V2, V1 and V0 respectively). At each WHITE cell, four empty border lists are constructed as illustrated in FIG. 3.

Figure 4A:
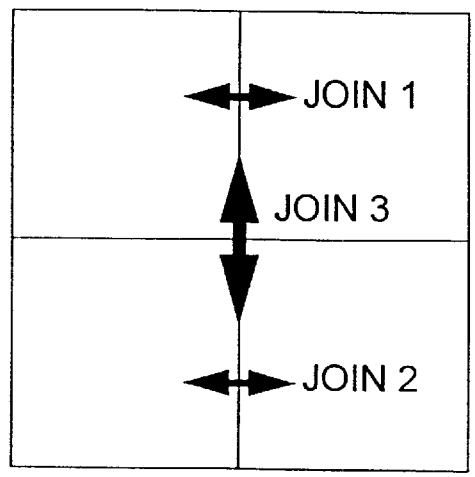
FIGS. 4A to 4D illustrate the process of joining of the sub-cells of a GREY cell.
Figure 4B:
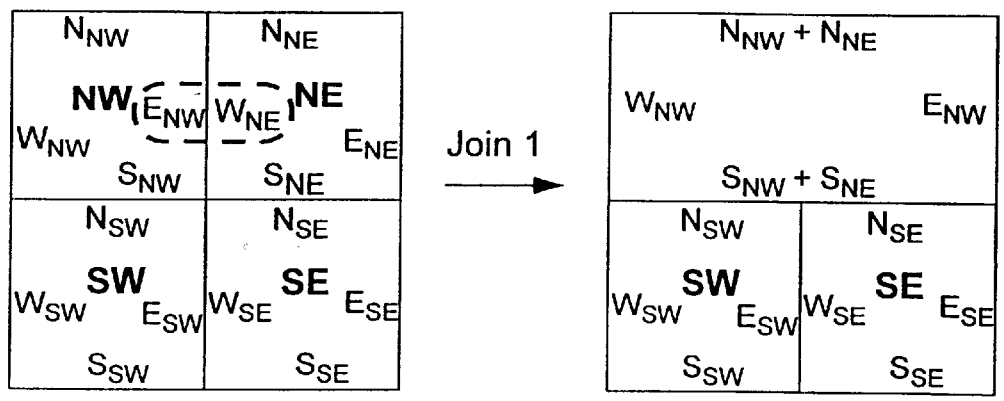
Figure 4C:
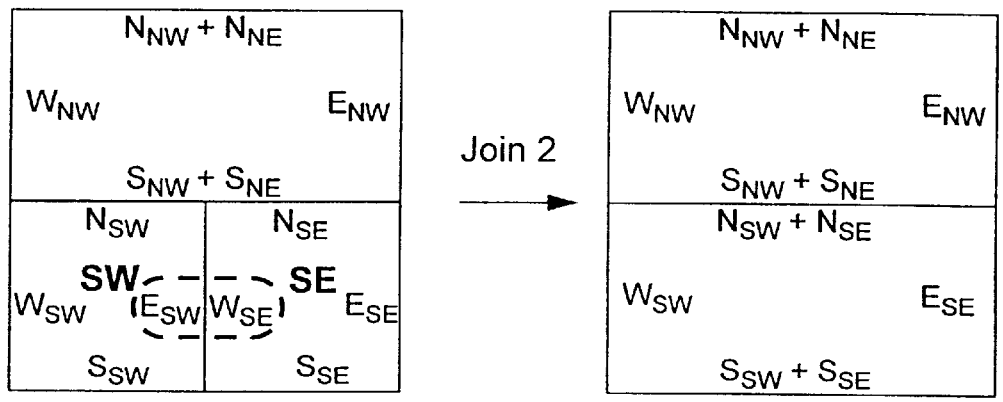
Figure 4D:
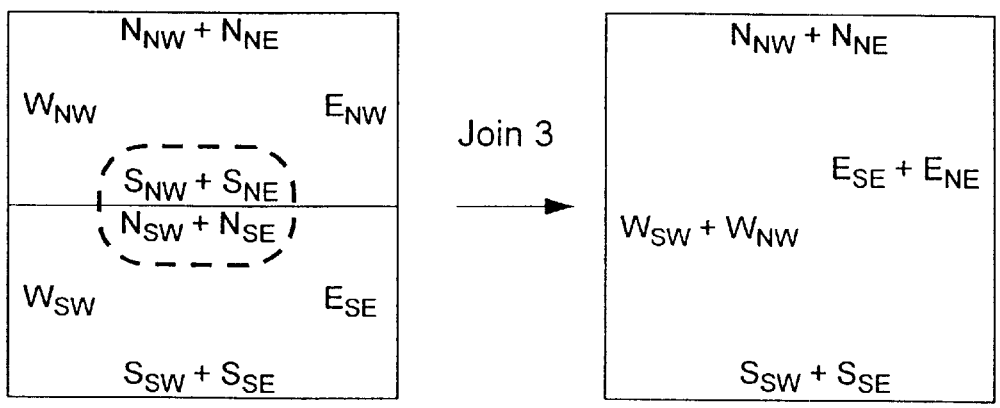

At each GREY cell, border lists obtained recursively for the four sub-cells are used to merge together the polygonal boundaries along common cell borders of the four sibling sub-cells. One embodiment of the joining process is a three-stage process as indicated in FIG. 4A where joins between horizontally adjacent sub-cells are performed first, followed by a vertical join between vertically adjacent sub-cells. This is seen in further detail in the sequence of FIGS. 4B to 4D. FIG. 4B shows a cell having four sub-cells denoted NW, NE, SW and SE. Each sub-cell has corresponding border edges denoted W, N, E and S. In FIG. 4B, the E border list of the NW sub-cell and the W border list of the NE sub-cell, as circled, are used to combine the NW and NE sub-cells. The combined sub-cells resulting of Join 1 are shown in FIG. 4B where the N border list is formed from a concatenation of N border list of the NW sub-cell and the N border list of the NE sub-cell. The S border list is formed in a corresponding manner, with the W border list being taken from that of the NW sub-cell and the E border list being taken from that of the NE sub-cell. FIG. 4C shows the operation for Join 2, this being practically analogous to that of Join 1. FIG. 4D shows the operation of Join 3 where the N border list of the combined SW and SE sub-cells and the S border list of the combined NW and NE sub-cells are used to combine the entire cell. The combined border lists for the entire cell now become:

N: concatenation of NW's N and NE's N border lists;
S: concatenation of SW's S and SE's S border lists;
E: concatenation of SE's E and NE's E border lists; and
W: concatenation of SW's W and NW's W border lists.

Thus, the border lists along the perimeter of the cell are concatenated to form the border lists returned for a GREY cell. An example of border lists for a GREY cell is shown in FIG. 5.

Figure 5:
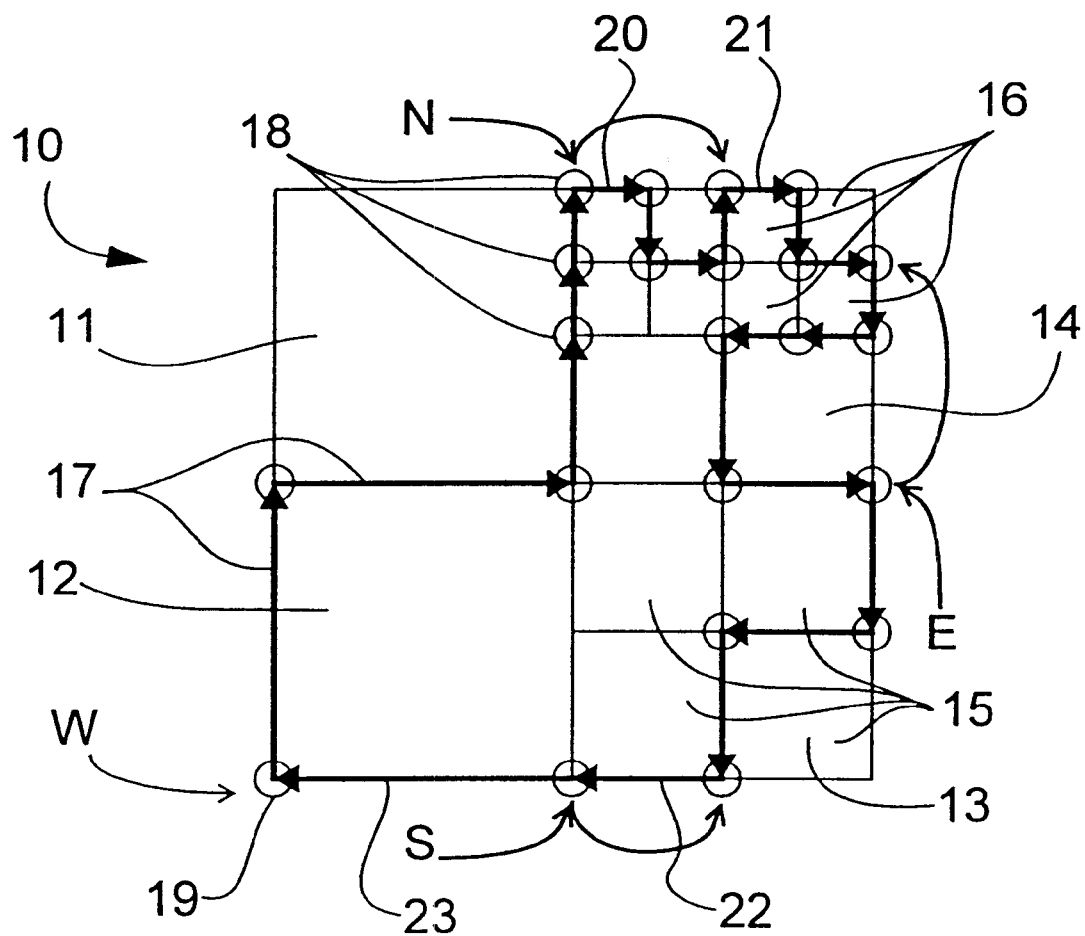
FIG. 5 illustrates one example of a quadtree cell whose boundary has been determined, showing final border lists.

FIG. 5 shows a GREY cell 10 having four sub-cells 11, 12, 13 and 14. As seen, both sub-cells 13 and 14 are further divided into four sub-cells 15. Two sub-cells 15 of sub-cell 14 are further again divided into sub-cells 16. Border lists (N, S, E and W) for the cell 10 are defined by those vertices whose immediately following edges 17 lie along the rectangular cell border. It is noted that in FIG. 5 only a few of the edges 17, vertices 18 and sub-cells 15, 16 are labelled as such so as to maintain clarity. The polygonal boundary of the region represented by the quadtree whose root is the cell 10 commences at some vertex 19 and proceeds between the vertices 18 until it returns to the initial vertex 19. As seen in FIG. 5, the border list N includes two edges 20 and 21. The list N starts with a pointer to the vertex at the start of the edge 20 with minimum x coordinate. The list continues with a pointer to the vertex at the start of the next edge 21 along the direction of increasing x coordinate. With respect to the border list S, again the pointers point to the start of the edges 22 and 23 but, in this case, in reverse order compared to the polygonal boundary representation (as also occurs with the border list E). This ordering is useful when simultaneously scanning an S border list and an N border list along a coincident border for the purpose of joining the polygons represented by two cells that share that border. Both border lists can be scanned in order of increasing x coordinate. E and W border lists are analogously stored in order of increasing y coordinate.

The first stage of the preferred method is described in more detail below.

The second stage of the method of the preferred embodiment is a scan through the vertices to find cycles utilising the "Flag" field of each vertex. For example, re-setting Flag (to zero) may represent an unmarked vertex, while setting Flag (to one) may represent a marked vertex. A marked vertex is one that has already been examined. All vertices are initially unmarked because none of them have as yet been examined. As the vertices are scanned, any marked vertices are skipped. Whenever an unmarked vertex is found, the Next field is used to trace the sequence of vertices, forming a polygon, marking vertices visited on the way. Certain other cleaning-up operations can be formed during this process including joining collinear edges, removing double points and discarding degenerate cycles that include only a single point. During this process, a polygon may, for example, be created as a separate data structure, or a pointer to the first vertex in each polygon may be retained.

Describing each of the stages in more detail, the recursive quadtree traversal stage is described by the following pseudocode that is initiated by calling the procedure "traverse_qtree" with the root cell.

procedure traverse_qtree(cell q; BorderLists b(output))
begin
   if q is a WHITE cell then
     Set up four empty border lists in b (eg. FIG. 3).
   else if q is a BLACK cell then begin
     Create vertices at the SE, SW, NE and NW corners of q.
     Link them into a clockwise cycle using the Next vertex pointer.
     Set up four border pointer lists in b, the E one containing the NE vertex as its single entry, the S one the SE vertex, the W one the SW vertex and the N one the NW vertex (eg. FIG. 2).
   end
   else q is a GREY cell begin
     call traverse_qtree with the NW cell, obtaining border lists for the NW cell.
     call traverse_qtree with the NE cell, obtaining border lists for the NE cell.
     call traverse_qtree with the SW cell, obtaining border lists for the SW cell.
     call traverse_qtree with the SE cell, obtaining border lists for the SE cell.
     call glue_cells, passing the NE sub-cell's W border list and NW sub-cell's E border list; merge using the y (N-S) coordinate (eg. Join 1 in FIG. 4).
     call glue_cells, passing the SE sub-cell's W border list and SW sub-cell's E border list; merge using the y (N-S) coordinate (eg. Join 2 in FIG. 4).
     Concatenate the N border lists of the SW and SE sub-cells, and the S border lists of the NW and NE sub-cells.
     call glue_cells, passing these concatenated border lists; merge using the x (E-W) coordinate (eg. Join 3 in FIG. 4).
     Concatenate the N border lists of the NW and NE sub-cells, the S border lists of the SW and SE sub-cells, the E border lists of the and NE sub-cells, and the W border lists of the SW and NW sub-cells.
     Return these concatenated border lists in b as the border lists of this cell.
   end
end The procedure (glue_cells) for gluing two sibling sub-cells using their border lists is described by the pseudocode below. It merges two sorted lists of edges. At any stage there is a next vertex from each list. Each of these two vertices, v and w, is the first of a pair of vertices (v and v.Next, w and w.Next) that define an edge along the border of the respective cell. In the first border list, v, edges run in the same direction as the border list, i.e., with the coordinate value increasing. In the second border list, w, edges run in the opposite direction. In other words:

$$v.x \leq v.Next.x, \; v.x \leq v.Border.x$$

$$w.x \geq w.Next.x, \; w.x \leq w.Border.x$$

The procedure is described using "x" as the coordinate. The procedure should be able to merge using either x or y coordinate ("Pt[0]" or "Pt[1]" in the vertex data structure of the preferred embodiment).

Figure 6:
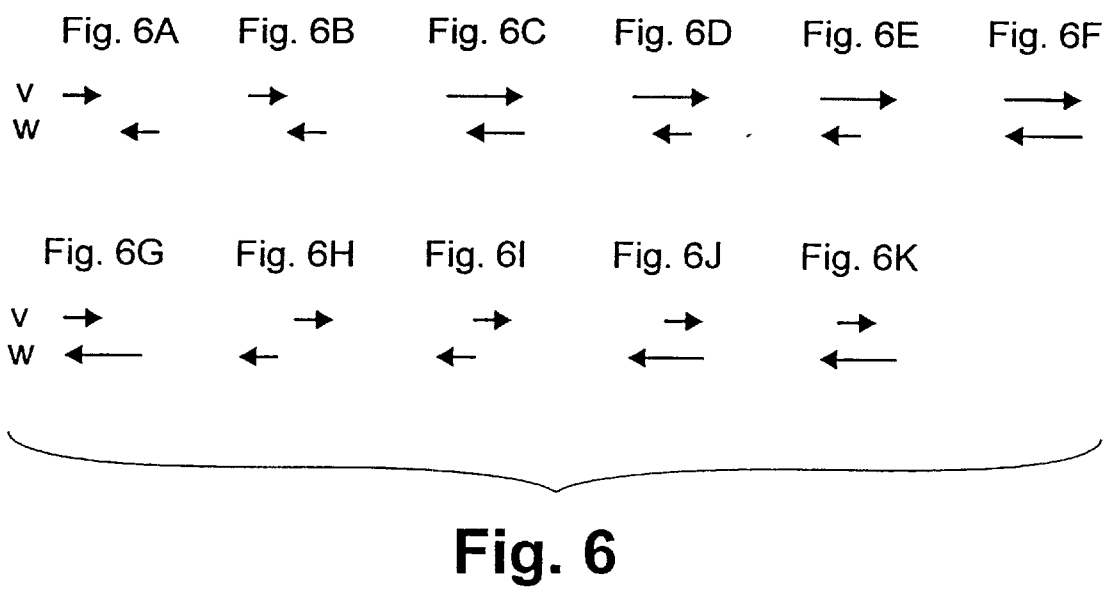
FIGS. 6A to 6K illustrate different possible cases when gluing sibling cells together.

There are eleven possible cases for the relationship between x coordinates of the next edges from the two lists as shown in FIGS. 6A to 6K. Each of those cases are dealt with in the following pseudocode which sets out the procedure for gluing cells together. FIGS. 6A and 6H depict edges that do not abut. FIGS. 6B and 6I depict edges that abut at a single point. FIG. 6F depicts two edges that abut along their entire length, and the remainder (FIGS. 6C, 6D, 6E, 6G, and 6K) depict edges that abut along some portion of their length.

Figure 7A:
FIGS. 7A and 7B illustrate cases that do not occur in quadtrees when gluing sibling cells together.
Figure 7B:
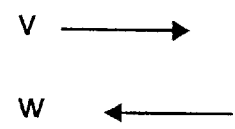

Two further cases do not occur due to the nature of quadtrees, and are illustrated in FIGS. 7A and 7B. For example, in FIG. 7A, the fact that w starts someway through v, means that on w's side there is greater sub-division, thus meaning that w cannot extend past v. FIG. 7B shows a corresponding situation.

Figure 8A:
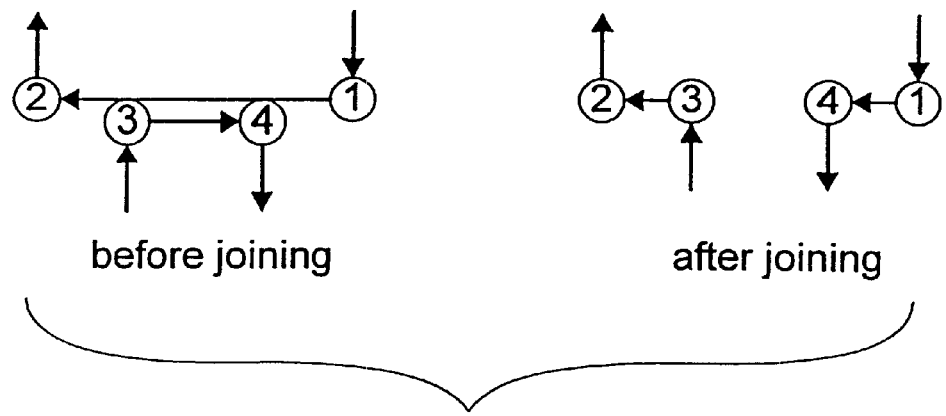
FIGS. 8A and 8B illustrate examples of the joining of polygons in adjacent cells in accordance with the method of the preferred embodiment.
Figure 8B:
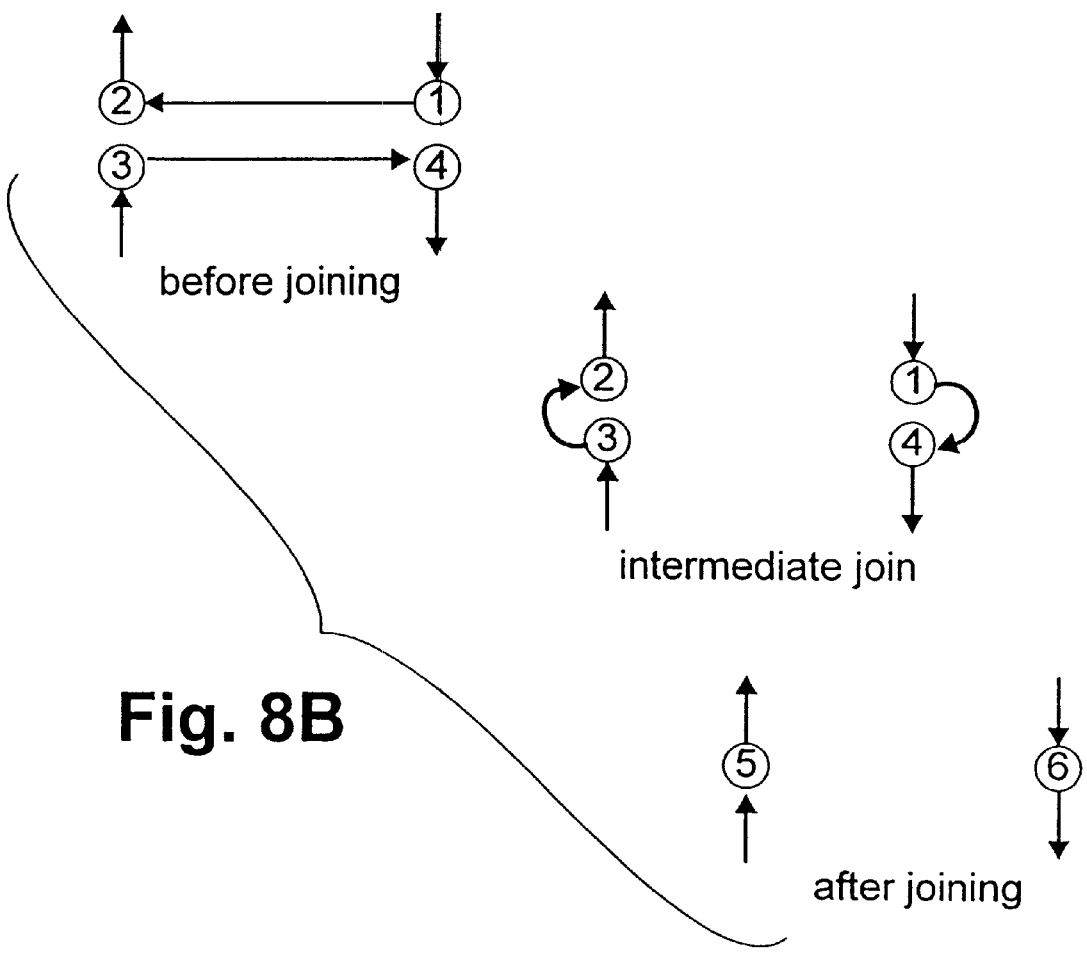

FIG. 8A illustrates an example outcome of the merging process that corresponds to the edge relationship shown in FIG. 6D or 6K. FIG. 8B illustrates an example of the process of merging wholly abutting edges and the consequential removal of redundant double points, seen present in the intermediate join.

The pseudocode listing can be as follows:

```
procedure glue_cells(Vertex v, w)
begin
    while there are more entries in both the v and the w border lists do
    begin
        if v.Next.x ≦ w.Next.x (cases Fig. 6A and 6B) then
            v ← v.Border (skip this v edge)
        else if v.x ≦ w.Next.x (cases Fig. 6C to 6G) then
            begin
                t ← v.Next, v.Next ← w.Next, w.Next ← t
                if t.x > w.x then
                begin
                    The change to w.Next has reversed the direction of the
                    edge from w to w.Next with respect to the coordinate
                    axis, making it like the v border list. Insert w into the v
                    border list, and step w on to the next w border list
                    entry.
                    t ← w, w ← w.Border, t.Border ← v.Border, v ← t
                end
                else
                begin
                    v ← v.Border
                    if t.x = w.x then
                        w ← w.Border
                end
            end
        else (cases Fig. 6H to 6K)
        begin
            if w.x ≦ v.x then
                w ← w.Border
            else
            begin
                t ← v.Next, v.Next ← w.Next, w.Next ← t,
                v ← v.Border
                if t.x = w.x then
                    w ← w.Border
            end
        end
    end
end
```

The cost (in terms of execution time) of the method of the preferred embodiment will be the sum of the costs of the following components:

(i) the cost of the quadtree traversal is proportional to the number of cells in the quadtree;

(ii) the merging of two border lists visits each vertex in the lists once, and each vertex only belongs to a single border list in its lifetime. (Note, however, that the merging procedure looks at each vertex v as well as its neighbour v.Next, so that each vertex is examined twice, thus the total cost of merging is proportional to the total number of vertices constructed); and (iii) the search for cycles visits each vertex twice, once in the linear search through all vertices, and once when following cycles around to mark the cells.

The number of vertices created will be four times the number of BLACK cells. Therefore, since the number of BLACK cells is bounded by the number of cells in the quadtree, the total cost is proportional to the number of cells. It can been shown that this is order O(p+q), where p is the perimeter of the polygon represented by the quadtree, and q is the maximum depth of the quadtree. This result compares favourably with the method of Dyer et al., which has cost proportional to the perimeter of the polygon.

FIG. 10A shows a binary matrix 50 of data that may represent pixel values in an image, or some other form of data. The matrix 50 is seen to have individual locations each having a corresponding data value. FIG. 10B shows a block (cell) decomposition A of the matrix 50 into ordered regions B to M of like data values according to known quadtree structures. FIG. 10C is a corresponding quadtree representation of the decomposition of FIG. 10B, where the sub-cells B and E to M represent leaf nodes of the quadtree. Application of the various embodiments of the present invention to the representations of FIGS. 10B and 10C results in a representation such as that shown in FIG. 10D where the region 52 having set data values, indicated by the blocks H, I, M and E of FIG. 10B, is defined by a single boundary description 54. As a consequence, it will be apparent that the quadtree representation of FIG. 10C may be converted to a form that describes the content of the matrix 50 in a way that is more efficient for some operations. Such a conversion has utility in the general field of region representation. Further, when used in relation to image data, the description 54 may be treated as a graphical object for the purposes of image editing or rendering.

The preferred embodiment of the present invention incorporating the above described method may be implemented as a computer application program hosted on the UNIX™ operating system. However, those skilled in the art will recognise that the described embodiment can be implemented on computer systems hosted by other operating systems. For example, the preferred embodiment can be performed on computer systems running MacOS™, OS/2™, DOS™. The application program may operate with or independent of a user interface to the deriving of polygonal boundaries from quadtree representations. The application program also has the ability to transmit and receive data to a connected digital communications network (for example the "Internet" or local area network).

Figure 9:
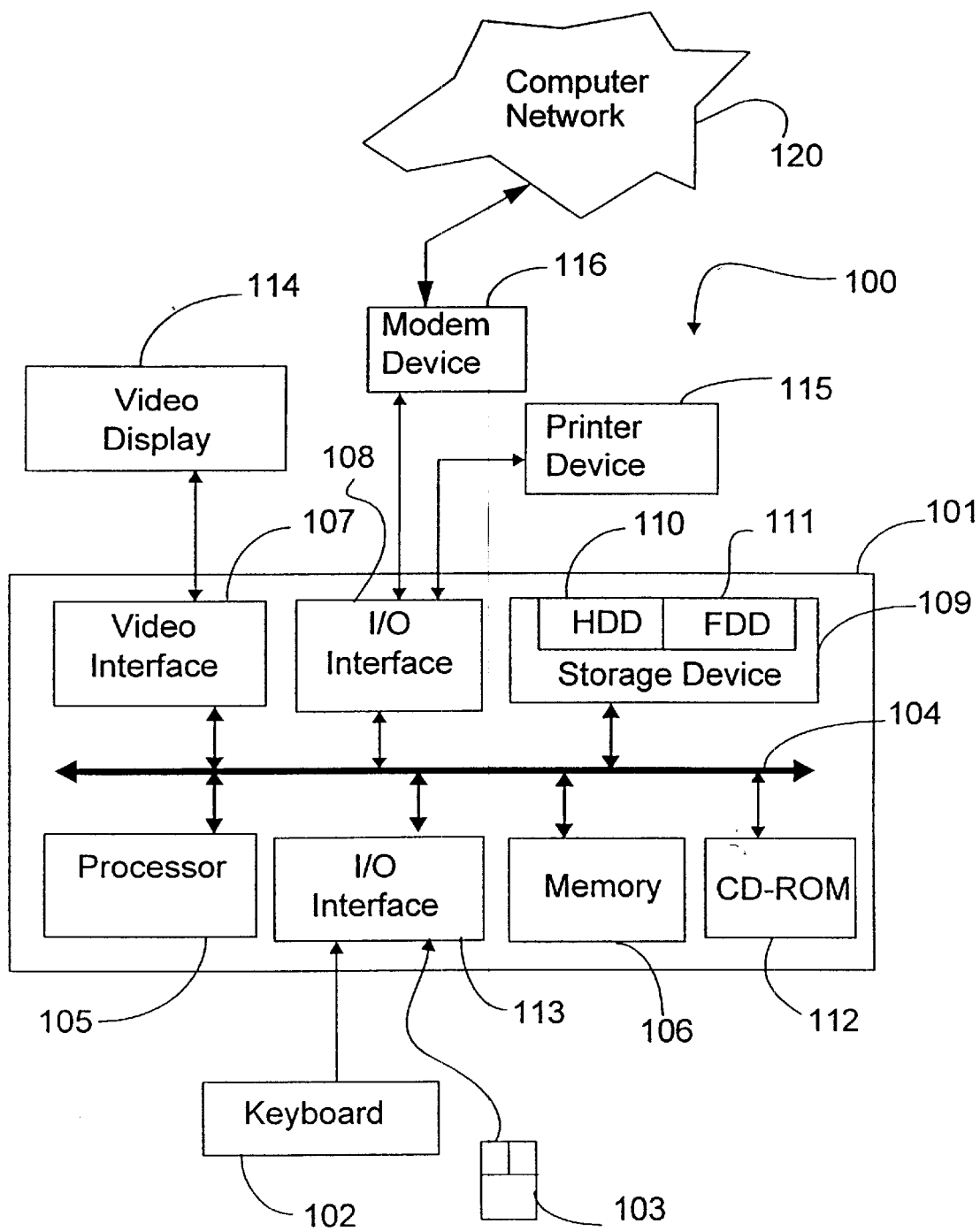
FIG. 9 is a schematic representation of a computer system in which the preferred embodiments may be implemented.

The preferred embodiment of the invention can be practised using a conventional general-purpose (host) computer system, such as the computer system 100 shown in FIG. 9, wherein the application program discussed above and to be described with reference to the other drawings is implemented as software executed on the computer system 100. The computer system 100 comprises a computer module 101, input devices such as a keyboard 102 and mouse 103, output devices including a printer 115 and a display device 114. A Modulator-Demodulator (Modem) transceiver device 116 is used by the computer module 101 for communicating to and from a communications network 120, for example connectable via a telephone line or other functional medium. The modem 116 can be used to obtain access to the Internet, and other network systems.

The computer module 101 typically includes at least one processor unit 105, a memory unit 106, for example formed from semiconductor random access memory (RAM) and read only memory (ROM), input/output (I/O) interfaces including a video interface 107, and an I/O interface 113 for the keyboard 102 and mouse 103 and optionally a joystick (not illustrated), and an interface 108 for the modem 116. A storage device 109 is provided and typically includes a hard disk drive 110 and a floppy disk drive 111. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art. Examples of computers on which the embodiments can be practised include IBM-PC's and compatibles, Sun Sparcstations or alike computer systems evolved therefrom. Typically, the application program of the preferred embodiment is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk, or alternatively could be read by the user from the network via the modem device 116.

Figure 11:
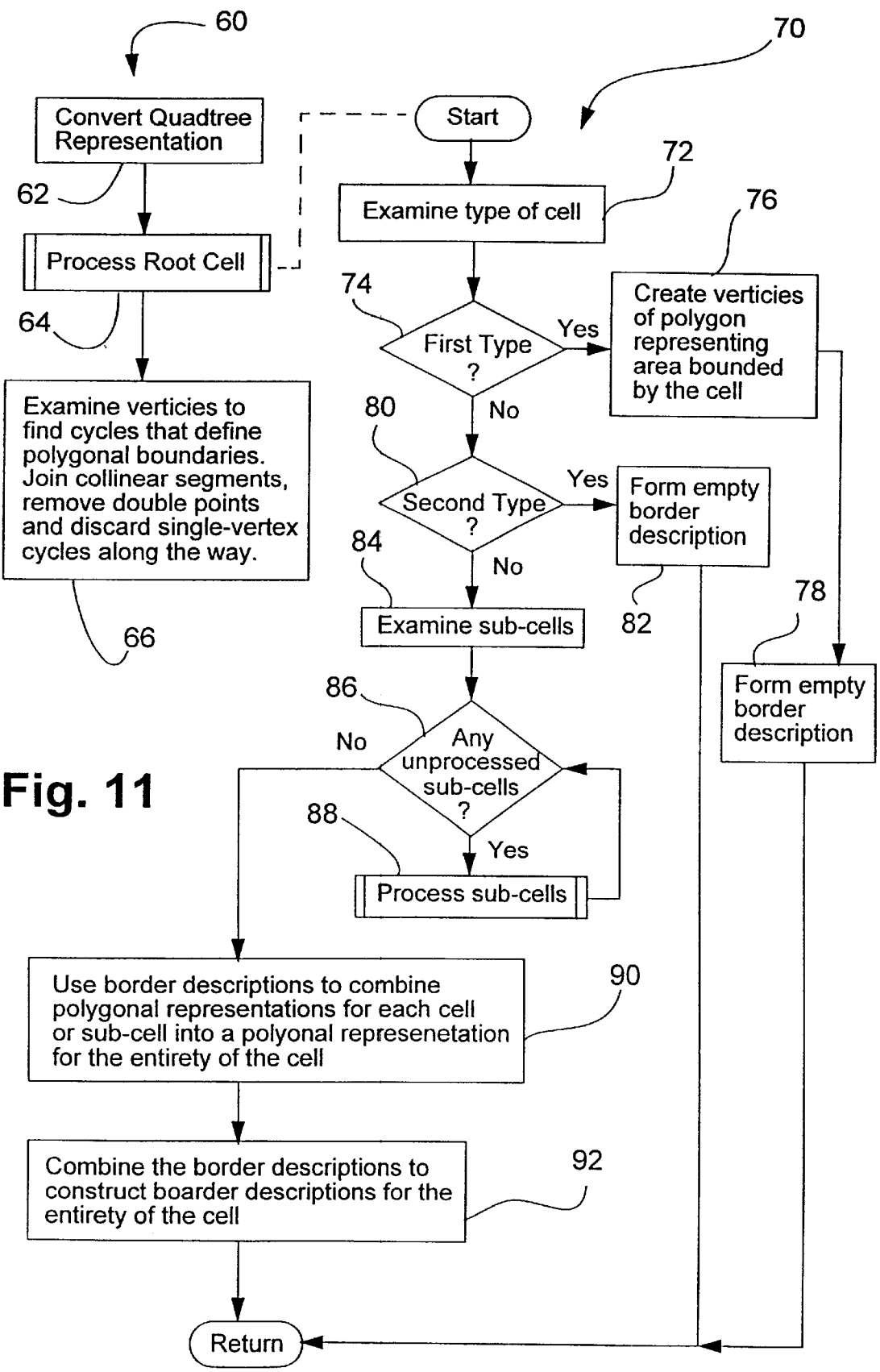
FIG. 11 is a flowchart depicting the operation of other embodiments.

FIG. 11 depicts a method 60 of converting a quadtree representation of image data into a corresponding representation of edges of regions within the image according to one specific embodiment. The method 60 commences with step 62 where quadtree representation of the image is provided. Step 64 commences the processing of every cell in the quadtree by invoking subroutine 70 on the root cell. Finally, step 66 examines the verticies to find cycles that define polygonal boundaries. Collinear segments are then joined, double points removed, single vertex cycles discarded.

Within subroutine 70, which is given a quadtree cell, control passes to step 72 that examines the type of cell. If, as determined in step 74, the cell is of a first particular uniform type, steps 76 and 78 follow to create a polygon that represents the area bounded by the cell, and to form a description of the structure of the borders of the cell. Control is then returned to where the subroutine was invoked.

Where the cell is not of the first type, control passes to step 80 for determining if the cell is of a second particular uniform type. If so, step 82 follows to form empty border descriptions for the cell. Control is again returned to where the subroutine was invoked.

Where the cell is of a third type not being one of the first or second types, step 84 follows to examine those sub-cells of the cell being considered. The subroutine 70 is then invoked in step 88 for each subcall.

When step 86 determines that all cells and sub-cells have been processed, step 90 follows which obtains the border descriptions and uses the border descriptions to combine the polygonal representations for the sub-cells of the cell into a polygonal representation for the entirety of the cell passed to the subroutine 70. Step 82 follows to combine the border descriptions to construct border descriptions for the entirety of the cell.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method of conversion of a quadtree representation of image data into a corresponding representation of edges of regions within said image, the method comprising the steps of:
   recursively processing each cell of the quadtree such that:
   (a) where said cell is of a first particular uniform type, creating a polygonal representation of an area bounded by the cell, and forming a description of the structure of the borders of said cell;
   (b) where said cell is of a second particular uniform type forming empty border descriptions for the cell;
   (c) where said cell is divided into quadrants,
      (i) recursively applying steps (a) to (c) to each of the quadrants in accordance with the quadtree representation,
      (ii) obtaining from step (i) a border description of each border of each quadrant;
      (iii) using said border descriptions to combine the polygonal representations for each quadrant of the cell into a polygonal representation for the entire cell, and
      (iv) combining said border descriptions to construct border descriptions for the entire cell;
   such that, at a root quadtree cell, a polygonal description of the region represented by the quadtree is formed.

2. A method according to claim 1 wherein said combining utilizes the border lists of the common border of the cell or node areas to be combined.

3. A method according to claim 2 wherein each cell or node's border description is a list of the first of each pair of vertices whose interconnecting edge lies along said border.

4. A method according to claim 3 wherein said utilization of border lists of the common border is based on the merging of two sorted lists.

5. A method according to claim 1 wherein the component regions represented by the tree are identified by examining the boundary structures created by the recursive process.

6. A method according to claim 5 wherein any of the following cleaning up operations are performed on said identified regions:
   (a) joining collinear edges; and/or
   (b) removing doubled up points; and/or
   (c) discarding degenerate regions that include only a single point.

7. A method of conversion of a tree representation of one or more data regions with each tree node representing a cell of regional data of a first particular uniform type, a second particular uniform type or a mixture of said types and wherein when a node represents a mixture of said types said node includes a number of child nodes representing sub-regions of said data, said conversion being to a corresponding representation of edges of data regions, the method comprising the steps of:
   recursively processing each node of said tree representation such that:
   (a) where the corresponding said cell is of the first particular uniform type, creating a polygon that represents the area bounded by the cell, and forming a description of the structure of the cell's borders;
   (b) where the corresponding said cell is of the second particular uniform type forming empty border descriptions for the cell;
   (c) where the corresponding said cell is divided into quadrants,
      (i) recursively applying steps (a) to (c) to each of the quadrants in accordance with the quadtree representation,
      (ii) obtaining from step (i) border description of each border of each quadrant;
      (iii) using said border descriptions to combine the polygonal representations for each quadrant of the cell into a polygonal representation for the entire cell, and
      (iv) combining border descriptions for the cell;
   such that, for the root node of the tree, a boundary structure is formed of the one or more regions of the tree defined by the nodes of first particular uniform type.

8. A method according to claim 7 wherein said combining utilizes the border lists of the common border of the cell or node areas to be combined.

9. A method according to claim 8 wherein a border description of each cell or node is a list of the first of each pair of vertices whose interconnecting edge lies along said border.

10. A method according to claim 9 wherein said utilization of border lists of the common border is based on the merging of two sorted lists.

11. A method according to claim 8 wherein the component regions represented by the tree are identified by examining the boundary structures created by the recursive process.

12. A method according to claim 11 wherein one or more cleaning up operations are performed on said identified regions, the cleaning up operations being selected from the group consisting of:
   (a) joining collinear edges;
   (b) removing doubled up points; and
   (c) discarding degenerate regions that include only a single point.

13. A method of converting a quadtree representation of image data into a corresponding representation of edges of regions within said image, said method comprising the steps of:
   recursively processing each cell of the quadtree such that:
   (a) where a cell is of a first particular uniform type, creating a polygon that represents the area bounded by the cell, and forming a description of the structure of the borders of said cell;
   (b) where a cell is of a second particular uniform type forming empty border descriptions for the cell;
   (c) where a cell is of a third type not being one of said first or second types, said cell is divided into sub-cells,
      (i) recursively applying steps (a) to (c) to each of said sub-cells in accordance with the quadtree representation,
      (ii) obtaining from step (i) a border description of each border of each said sub-cell;
      (iii) using said border descriptions to combine the polygonal representations for each said sub-cell into a polygonal representation for the entirety of said cell, and
      (iv) combining said border descriptions to construct border descriptions for the entirety of said cell;
   to thereby form, at a root quadtree cell, a polygonal description of the region represented by the quadtree.

14. A method according to claim 13 wherein said first particular uniform type refers to a cell whose leaf node is entirely within the represented region, and said second particular uniform type refers to a cell whose leaf node is entirely outside the represented region.

15. A method according to claim 13 wherein said combining utilizes the border lists of the common borders between said sub-cells to be combined.

16. A method according to claim 15 wherein each said border description is a list of the first of each pair of vertices whose interconnecting edge lies along said border.

17. A method according to claim 16 wherein the utilization of border lists of any one said common border is based on the merging of two sorted ones of said lists.

18. A method according to claim 13 wherein said cells represented by said quadtree are identified by examining the boundary structures created by said recursive processing.

19. A method according to claim 18 further comprising performing cleaning up operations on said identified cells, said operations being selected from the group consisting of:
   (a) joining collinear edges;
   (b) removing doubled up points; and
   (c) discarding degenerate cells that include only a single point.

20. A method of converting a tree representation of one or more data regions to a corresponding representation of edges of said data regions, said tree representation being formed by a plurality of nodes each representing a cell of regional data of a first particular uniform type, a second particular uniform type, or of a third type not being one of the first or second types, and wherein when one said node represents data of said third type, said one node includes a number of child nodes representing sub-regions of said data described by corresponding sub-cells, said method comprising the steps of:
   recursively processing each said node of said tree representation such that:
   (a) where the corresponding said cell is of said first particular uniform type, creating a polygon that represents the area bounded by said cell, and forming a description of the structure of borders of said cell;
   (b) where the corresponding said cell is of said second particular uniform type forming empty border descriptions for said cell;
   (c) where the corresponding said cell is of said third type, dividing said cell into sub-cells, and
      (i) recursively applying steps (a) to (c) to each of said sub-cells in accordance with the tree representation,
      (ii) obtaining from step (i) a border description of each border of each said sub-cell;
      (iii) using said border descriptions to combine the polygonal representations for each said sub-cell into a polygonal representation for the entirety of said cell, and
      (iv) combining border descriptions for said cell;
   to thereby form, for a root node of the tree representation, a boundary structure of the one or more regions of the tree defined by the nodes of first particular uniform type.

21. A method according to claim 20 wherein said first particular uniform type refers to cell whose leaf node is entirely within the represented region, and said second particular uniform type refers to a cell whose leaf node is entirely outside the represented region.

22. A method according to claim 20 wherein said tree representation comprises a quadtree representation.

23. A method according to claim 20 wherein said combining utilizes the border lists of the common borders between said sub-cells to be combined.

24. A method according to claim 23 wherein said border description is a list of the first of each pair of vertices whose interconnecting edge lies along said border.

25. A method according to claim 24 wherein the utilization of border lists of any one said common border is based on the merging of two sorted ones of said lists.

26. A method according to claim 20 wherein said cells represented by said tree representation are identified by examining the boundary structures created by said recursive processing.

27. A method according to claim 26 further comprising performing cleaning up operations on said identified cells, said operations being selected from the group consisting of:
   (a) joining collinear edges;
   (b) removing doubled up points; and
   (c) discarding degenerate cells that include only a single point.

28. Apparatus for converting a tree representation of one or more data regions to a corresponding representation of edges of said data regions, said tree representation being formed by a plurality of nodes each representing a cell of regional data of a first particular uniform type, a second particular uniform type, or of a third type not being one of the first or second types, and wherein when one said node represents data of said third type, said one node includes a number of child nodes representing sub-regions of said data described by corresponding sub-cells, said apparatus comprising:

means for recursively processing each said node of said tree representation, said means for recursively processing comprising:

first means for determining if the corresponding said cell is of said first particular uniform type, and if so, creating a polygon that represents an area bounded by said cell, and forming a description of the structure of borders of said cell;

second means for determining if the corresponding said cell is of said second particular uniform type, and if so, forming empty border descriptions for said cell;

third means for determining if the corresponding said cell is of said third type, and if so, dividing said cell into sub-cells, said third means including fourth means for recursively applying the processes of said first, second and third means to each of said sub-cells in accordance with the tree representation, fifth means for obtaining from said fourth means a border description of each border of each said sub-cell;

sixth means for using said border descriptions to combine the polygonal representations for each said sub-cell into a polygonal representation for the entirety of said cell, and seventh means for combining border descriptions for said cell;

said means for recursively processing thereby forming, for a root node of the tree representation, a boundary structure of the one or more regions of the tree defined by the nodes of first particular uniform type.

29. Apparatus according to claim 28 wherein said first particular uniform type refers to a cell whose leaf node is entirely within the represented region, and said second particular uniform type refers to a cell whose leaf node is entirely outside the represented region.

30. Apparatus according to claim 28 wherein said tree representation comprises a quadtree representation.

31. Apparatus according to claim 28 wherein said seventh means utilizes the border lists of the common borders between said sub-cells to be combined.

32. Apparatus according to claim 31 wherein each said border description is a list of the first of each pair of vertices whose interconnecting edge lies along said border.

33. Apparatus according to claim 32 wherein the utilization of border lists of any one said common border is based on the merging of two sorted ones of said lists.

34. Apparatus according to claim 28 wherein said cells represented by said tree representation are identified by examining the boundary structures created by said means for recursive processing.

35. Apparatus according to claim 34 further comprising eighth means for performing cleaning up operations on said identified cells, said operations being selected from the group consisting of:

(a) joining collinear edges;

(b) removing doubled up points; and (c) discarding degenerate cells that include only a single point.

36. A computer readable medium incorporating a computer program product for converting a tree representation of one or more data regions to a corresponding representation of edges of said data regions, said tree representation being formed by a plurality of nodes each representing a cell of regional data of a first particular uniform type, a second particular uniform type, or of a third type not being one of the first or second types, and wherein when one said node represents data of said third type, said one node includes a number of child nodes representing sub-regions of said data described by corresponding sub-cells, said computer program product implementing a method comprising the steps of:

recursively processing each said node of said tree representation such that:

(a) where the corresponding said cell is of said first particular uniform type, creating a polygon that represents the area bounded by said cell, and forming a description of the structure of borders of said cell;

(b) where the corresponding said cell is of said second particular uniform type forming empty border descriptions for said cell;

(c) where the corresponding said cell is of said third type, dividing said cell into sub-cells, and (i) recursively applying steps (a) to (c) to each of said sub-cells in accordance with the tree representation, (ii) obtaining from step (i) a border description of each border of each said sub-cell;

(iii) using said border descriptions to combine the polygonal representations for each said sub-cell into a polygonal representation for the entirety of said cell, and (iv) combining border descriptions for said cell;

to thereby form, for a root node of the tree representation, a boundary structure of the one or more regions of the tree defined by the nodes of first particular uniform type.

37. A computer readable medium according to claim 36 wherein said first particular uniform type refers to a cell whose leaf node is entirely within the represented region, and said second particular uniform type refers to a cell whose leaf node is entirely outside the represented region.

38. A computer readable medium according to claim 36 wherein said tree representation comprises a quadtree representation.

39. A computer readable medium according to claim 36 wherein said combining utilizes the border lists of the common borders between said sub-cells to be combined.

40. A computer readable medium according to claim 39 wherein each said border description is a list of the first of each pair of vertices whose interconnecting edge lies along said border.

41. A computer readable medium according to claim 40 wherein the utilization of border lists of any one said common border is based on the merging of two sorted ones of said lists.

42. A computer readable medium according to claim 36 wherein said cells represented by said tree representation are identified by examining the boundary structures created by said recursive processing.

43. A computer readable medium according to claim 42 further comprising performing cleaning up operations on said identified cells, said operations being selected from the group consisting of:

(a) joining collinear edges;

(b) removing doubled up points; and (c) discarding degenerate cells that include only a single point.

44. A method of converting a quadtree representation of image data into a corresponding representation of edges of regions within said image, said method comprising the steps of:

(A) processing each cell of the quadtree by:
- (A1) determining if said cell is of a first particular uniform type, and if so creating a polygon that represents the area bounded by the cell, and forming a description of the structure of the borders of said cell;
- (A2) where said cell is not of said first type, determining if said cell is of a second particular uniform type, and if so, forming empty border descriptions for the cell;
- (A3) where said cell is of a third type not being one of said first or second types, dividing said cell into sub-cells, and processing said sub-cells according to steps (A) in accordance with the quadtree representation;

(B) obtaining the border descriptions form step (A);
- (B2) using said border descriptions from steps (A1) and (A2) to combine the polygonal representations for each said sub-cell into a polygonal representation for the entirety of said cell, and
- (B2) combining said border descriptions to construct border descriptions for the entirety of said cell;

to thereby form, at a root quadtree cell, a polygonal description of the region represented by the quadtree.

* * * * *

UNITED STATES PATENT AND TRADEMARK OFFICE
CERTIFICATE OF CORRECTION

| | |
|---|---|
| PATENT NO. | : 6,466,696 B1 |
| DATED | : October 15, 2002 |
| INVENTOR(S) | : George Politis |

It is certified that error appears in the above-identified patent and that said Letters Patent is hereby corrected as shown below:

<u>Drawings,</u>
Sheet 9, Fig. 11, "verticies" (both occurrences) should read -- vertices --; "polygonal representation" should read -- polygonal representation --; and "boarder" should read -- border --.

<u>Column 2,</u>
Line 41, "type;" should read -- type: --; and
Line 57, "Other" should read -- ¶ Other --.

<u>Column 3,</u>
Line 25, "sentation;" should read -- sentation; and --.

<u>Column 6,</u>
Line 16, "the and" should read -- the NW and --; and
Line 49, "61" should read -- 6I --.

<u>Column 8,</u>
Line 62, "alike" should read -- like --.

<u>Column 9,</u>
Line 12, "verticies" should read -- vertices --;
Line 29, "subcall." should read -- sub-cell. --; and
Line 35, "Step 82" should read -- Step 92 --.

<u>Column 12,</u>
Line 33, "cell" should read -- a cell --; and
Line 42, "said" should read -- each said --.

UNITED STATES PATENT AND TRADEMARK OFFICE
CERTIFICATE OF CORRECTION

PATENT NO. : 6,466,696 B1
DATED : October 15, 2002
INVENTOR(S) : George Politis

It is certified that error appears in the above-identified patent and that said Letters Patent is hereby corrected as shown below:

<u>Column 16,</u>
Line 2, "steps (A)" should read -- step (A) --;
Line 4, "form" should read -- from --; and
Line 5, "(B2)" should read -- (B1) --.

Signed and Sealed this

Twenty-first Day of October, 2003

JAMES E. ROGAN
*Director of the United States Patent and Trademark Office*